United States Patent [19]

Lee et al.

[11] Patent Number: 5,061,377
[45] Date of Patent: Oct. 29, 1991

[54] PIPELINE REACTOR AND METHOD

[75] Inventors: Robert G. H. Lee, Montreal; Derek Hornsey, Beaconsfield, both of Canada; Arthur S. Perkins, Moraga, Calif.

[73] Assignee: Canadian Liquid Air Ltd./Air Liquide Canada, Montreal, Canada

[21] Appl. No.: 384,427

[22] Filed: Jul. 25, 1989

[51] Int. Cl.⁵ .................................................. C02F 1/78
[52] U.S. Cl. .................................... 210/752; 210/758; 210/760
[58] Field of Search ............... 210/747, 758, 760, 761, 210/752

[56] References Cited

U.S. PATENT DOCUMENTS

| | | | |
|---|---|---|---|
| 3,549,528 | 12/1970 | Armstrong | 210/760 |
| 3,655,343 | 4/1972 | Galeano | 210/758 |
| 3,696,929 | 10/1972 | Shah | 210/758 |
| 3,730,881 | 5/1973 | Armstrong | 210/202 |
| 3,805,481 | 4/1974 | Armstrong | 210/760 |
| 3,853,764 | 12/1974 | Armstrong | 210/202 |
| 3,998,714 | 12/1976 | Armstrong | 210/758 |
| 4,073,727 | 2/1978 | Garrigues | 210/758 |
| 4,118,447 | 10/1978 | Richter | 261/122 |
| 4,156,650 | 5/1979 | Garrett | 210/758 |
| 4,239,589 | 12/1980 | Elton et al. | 210/758 |
| 4,273,660 | 6/1981 | Beitzel | 210/760 |
| 4,313,788 | 2/1982 | Gulley | 210/758 |
| 4,780,215 | 10/1988 | Carlson | 210/760 |
| 4,851,637 | 7/1989 | Stanton et al. | 261/122 |
| 4,853,136 | 8/1989 | Roussel et al. | 210/761 |

FOREIGN PATENT DOCUMENTS 2006852A 5/1979 United Kingdom .

Primary Examiner—Stanley S. Silverman
Assistant Examiner—Cynthia Nessler
Attorney, Agent, or Firm—Oblon, Spivak, McClelland, Maier & Neustadt

[57] ABSTRACT

A gas, for example, oxygen which has low solubility in water is efficiently dissolved and reacted with a substance in a flowing liquid medium by injecting the gas into the flowing liquid at spaced apart points such that a bubble flow condition is maintained and the injected gas is dissolved and substantially consumed by reaction with the substance in the interval between adjacent injection points; in this way the gas is injected at a point at which the aqueous liquid has maximum dissolving capacity and the number of injection points can be minimized; in another embodiment oxygen injection is controlled to maintain a desired oxygen:liquid ratio effective for efficient dissolving of the oxygen while maintaining the bubble flow condition, however, this requires more injection points.

14 Claims, 2 Drawing Sheets

PIPELINE REACTOR AND METHOD

BACKGROUND OF THE INVENTION i) Field of the Invention

This invention relates to a method and apparatus for reacting a gas having a low solubility in water with a substance in an aqueous medium.

ii) Description of Prior Art

Certain gases such as oxygen have a low solubility in water and aqueous liquids, for example, solutions and suspensions. The solubility of oxygen, in an aqueous liquid, decreases as the temperature of the aqueous liquid increases and as the concentration of the substance dissolved or suspended therein increases. This is illustrated in Table I below.

| LIQUOR | PRESSURE ATMOS. | TEMPERATURE °C. | SOLUBILITY MG/L |
| --- | --- | --- | --- |
| WATER | 1 | 20 | 44 |
| WATER | 7 | 93 | 143. |
| NaOH SOLN 2M | 7 | 93 | 57 |

In many industrial operations it is required to react a large quantity of oxygen gas with a substance in an aqueous vehicle, for example, a solution or suspension of the substance in water.

When the ratio of gas to liquid is very high, the method conventionally employed involves dissolving the gas, for example, oxygen, in the liquid by sparging into an agitated tank holding a large volume of the liquid, or the use of a tall gas absorption tower. However, these conventionally employed methods are not especially cost effective and involve large apparatus which is space consuming.

Furthermore, sparging into an agitated tank open to the atmosphere results in low oxygen transfer and poor utilization of oxygen. Sparging into a closed and pressurized tank requires a gas recirculation system which increases the cost significantly.

Packed absorption towers have been used, with both gas and liquid recirculation. However, such towers require long gas-liquid contact times with high gas and liquid recirculation rates necessitating large towers and high capital cost.

U.S. Pat. No. 3,696,929, I. S. Shah, issued Oct. 10, 1972, describes a low pressure sinuous pipe for oxidation of black liquor with oxygen, in which turbulence is low so as to inhibit foam formation, and the concentration of free oxygen in the dispersed bubble phase remains substantially constant. The U.S. Patent does not address the problem of efficient oxygen utilization based on the low solubility of oxygen in the liquor being oxidized. U.K. Published Patent Specification 2,006,852, published May 10, 1979, B. S. Kirk et al describes gravitational fall zones for injection of oxygen into pulp and controlled introduction of alkali to maintain an alkaline pH of 10–12.5; provision is made for venting excess, undissolved oxygen.

SUMMARY OF THE INVENTION

It is an object of this invention to provide a method and apparatus for efficiently dispersing, dissolving and reacting a gas of low solubility in water, for example, oxygen, with a substance in an aqueous medium.

In accordance with the invention efficient reaction between the gas, for example, oxygen, and an aqueous liquid comprising a substance to be reacted in an aqueous medium, necessitates maximizing the amount of gas dissolved in the aqueous medium for reaction with the substance, while maintaining a bubble flow condition in the aqueous liquid.

In accordance with the invention the aqueous liquid flows along a flow line effective to maximize the flow path of the liquid per unit length of effective travel, at a velocity effective to induce turbulent flow conditions in the flow line. The aqueous liquid in the flow path is maintained at a pressure of 2 to 20 atmospheres. A gas of low solubility in water which reacts with the substance in the liquid is introduced in the form of small gas bubbles under pressure into the flowing liquid in the flow path through a plurality of spaced apart injection ports; the gas is introduced as gas bubbles having a diameter of not more than 100 $\mu$.

The flow pattern of the liquid and gas is such that a bubble flow condition is exhibited throughout the flow path. In other words, coalescence of gas bubbles to form gas slugs giving rise to a condition of slug flow is avoided, as is annular mist flow in which liquid tends to flow along the wall of the flow path and the gas flows generally centrally of the flow path entraining liquid droplets.

In a preferred embodiment substantially all of the gas injected per unit volume of the flowing liquid is consumed in the interval of flow between adjacent injection ports; in this way the solubility capacity or dissolving capacity of the flowing liquid for the gas is maximized at each injection port.

In particular the parameters of the method including the liquid velocity, pressure and rate of gas injection, volume of the flow line and spacing of the gas injection ports are predetermined or controlled so that a volume of liquid flowing between a first gas injection port and an adjacent downstream injection port has substantially consumed the oxygen injected at the first injection port by the time it reaches the adjacent downstream port. In this way the capacity of the liquid to dissolve the gas is at a maximum at each injection port. If the parameters are controlled so that completion of the gas consumption by the flowing liquid coincides with the arrival of the liquid at the adjacent downstream injection port, then the efficiency of operation, including efficiency of gas usage and of the flow path, is maximized.

The gas is, in particular, injected through porous diffusers which produce fine bubbles of less than 100 $\mu$ diameter and preferably 20 to 50 diameter. The fine bubbles are dispersed by the turbulent conditions in the flow line, and rapidly dissolve in the liquid so that they can react with the substance in the liquid.

The turbulent flow conditions in the flow line are particularly described by the Reynolds number R where $$R = \frac{\rho v p}{n}$$

in which
p = density of liquid
v = velocity of flow of liquid
d = diameter of flow line
n = viscosity of liquid.

For a flow line of 1 to 3 inches diameter and a velocity of at least 5 ft./sec. a typical pulp liquor treated in accordance with the invention will have a Reynolds number exceeding 50,000.

The substances in pulp liquors which are to be reacted with oxygen gas will typically have a particle size in excess of 100 $\mu$; employing oxygen gas bubbles of smaller size facilitates efficient contact and reaction between the particles of the substance and the oxygen gas.

The efficient consumption of the injected gas, whereby all of the gas is essentially consumed by the flowing liquid in the interval between adjacent injection ports avoids the problem of foaming associated with some prior methods.

In the case of oxygen gas injection in a pulp liquor the oxygen is, more especially, injected to establish an oxygen:liquid ratio of 0.1 to 1.5:10, more usually 0.5 to 1.0:10, by volume, in the region of the injection port, at the operating pressure of 1 to 20 atmospheres and operating temperatures of, typically, 50° to 105° C.

It is also beneficial to take account of the velocity of flow of the pulp liquor when selecting the oxygen:liquid ratio. Thus for liquid flow velocity of 5 ft/sec. the ratio is preferably not greater than 1.0:10, whereas for higher velocities of 10 ft/sec. or more the ratio should not exceed 1.5:10.

The flow line of the liquid more especially provides a tortuous or circuitous flow path; in particular the flow line may be sinuous.

In accordance with the invention the oxygen is, in particular, forced through a diffuser under pressure into the flowing liquid, at the injection port, whereby small gas bubbles are developed and the energy of the gas is exploited in the dissolving.

The liquid suitably has a residence time in the flow line of about 1 to about 4 minutes.

In accordance with the invention, and as a result of the control of the oxygen injection, an aqueous pulp liquor can be recovered which is substantially free of unreacted oxygen, and without provision being made for venting of undissolved oxygen. In this way the operation is rendered efficient and foaming in subsequent operations resulting from the presence of residual undissolved oxygen is avoided.

In accordance with another aspect of the invention the oxygen is not fully consumed in the interval of flow between adjacent injection ports but is injected at the spaced apart injection ports in amounts to re-establish the desired oxygen:liquid ratio of 0.1 to 1.5:10. This procedure has the disadvantage that it necessitates a greater number of injection ports.

In another aspect of the invention there is provided a reactor assembly including a tortuous or circuitous pipeline, for example, a sinuous pipeline, having an upstream inlet line and a downstream outlet line. The pipeline is effective to maximize the flow path of liquid per unit length of effective travel between the inlet and outlet lines. A plurality of spaced apart injection ports in the pipline each has a gas diffuser having a pore size of not more than 100 $\mu$. The injection ports are spaced such that gas injected into a liquid flowing past an injection port is substantially consumed in the interval between such injection port and an adjacent downstream injection port, and a bubble flow condition is maintained.

BRIEF DESCRIPTION OF THE DRAWINGS

The invention is further explained and illustrated in particular and preferred embodiments by reference to the accompanying drawings in which.

DESCRIPTION OF PREFERRED EMBODIMENTS WITH REFERENCE TO THE DRAWINGS

Figure 1:
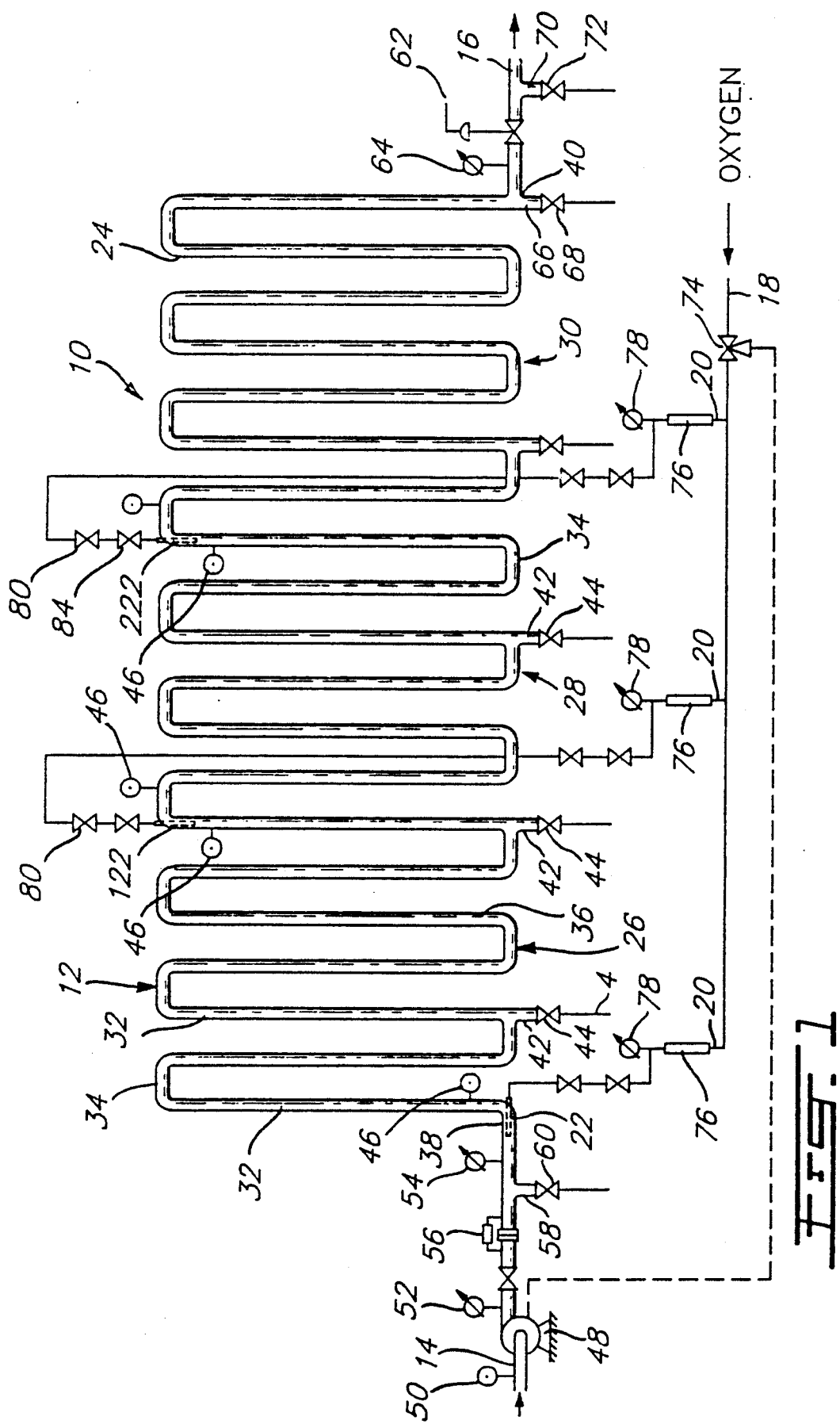
FIG. 1 is a schematic representation of a reactor assembly of the invention for use in carrying out the method of the invention.

With particular reference to FIG. 1, a reactor assembly 10 includes a reactor 12, an inlet line 14, an outlet line 16, an oxygen main line 18 and oxygen branch lines 20 terminating in diffusers 22, 122 and 222.

Reactor 12 comprises a sinuous pipeline 24 having an upstream reaction zone 26, and intermediate reaction zone 28 and a downstream reaction zone 30; the zones 26, 28 and 30 of sinuous pipeline 24 are defined by a plurality of generally parallel, straight, elongate pipe portions 32, adjacent pipe portions 32 being connected by U-bend pipe portions 34, to form a sinuous flow path 36.

Inlet line 14 is connected to the upstream pipe portion 32 of reaction zone 26 by an inlet bend 38 and outlet line 16 is connected to the downstream pipe portion 32 of reacting zone 30 by an outlet bend 40.

Sampling lines 42 communicate with four of the U-bend pipe portions 34, each of the sampling lines 42 having a valve 44.

Temperature indicators 46 are mounted in pipe line 24 in the vicinity of diffusers 22, 122 and 222.

Inlet line 14 includes a pump 48, a temperature indicator 50, pressure gauges 52 and 54 and a flow meter 56.

A sampling line 58 having a valve 60 communicates with inlet line 14.

Outlet line 16 includes a pressure regulating valve 62 and a pressure gauge 64.

A sampling line 66 having a valve 68 communicates with outlet bend 40 and a sampling line 70 having a valve 72 communicates with outlet line 16.

Oxygen main line 18 includes a solenoid valve 74 interlocked with pump 48 in inlet line 14.

Each of the oxygen branch lines 20 has a flow meter 76, a pressure gauge 78 and a shut-off valve 80.

Figure 2:
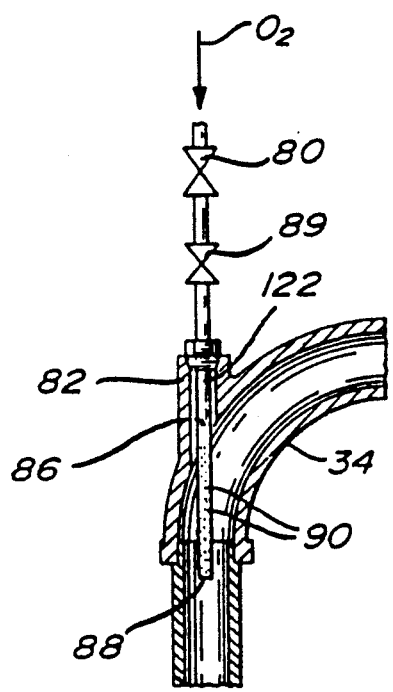
FIG. 2 shows a detail of the mounting of a diffuser in the assembly of FIG. 1.

With particular reference to FIG. 2, there is shown a detail of the mounting of the diffuser 122.

A diffuser port 82 is mounted in U-bend pipe portion 34. The oxygen branch lines 20 include a non-return valve 89 downstream of the shut-off valve 80. Diffuser 122 comprises a porous, elongate pipe member 86, closed at its outer end 88, and having a plurality of fine pores 90. The pipe member 86 may be, for example, of sintered stainless steel or porous ceramic material having pores 90 of 100 microns or less.

Diffuser 222 is mounted in the same manner as diffuser 122 at a U-bend portion 34 at the commencement of the downstream reaction zone 30. Diffuser 22 is mounted in like manner in inlet bend 38 at the commencement of the upstream reaction zone 26.

Thus each of the reaction zones 26, 28 and 30 is composed of a plurality of sinusoids or undulations, each sinusoid or undulation being formed from a pair of adjacent straight elongate pipe portions 32 and a connecting U-bend portion 34.

A significant feature of the invention is that a single diffuser provides the oxygen gas requirement for a plurality of sinusoids or undulations of the flow path 36 defined in a pipeline 24.

Thus in the particular embodiment illustrated in FIG. 1, diffuser 22 provides the oxygen requirement for the upstream reaction zone 26 which contains 7 pipe portions 32, and thus about 3.5 sinusoids or undulations.

In like manner diffuser 122 provides the oxygen for intermediate reaction zone 28 and diffuser 222 provides the oxygen for downstream reaction zone 30. This is to be contrasted with the afore-mentioned U.S. Pat. No. 3,696,929 in which each straight pipe portion has a plurality of gas injection ports.

In accordance with the invention the number of diffusers, i.e., 22, 122 and 222 for gas injection is minimized while maximizing the efficiency of oxygen gas transfer.

In operation aqueous liquid containing a substance to be oxidized is pumped from a source (not shown) along inlet line 14 by pump 48 into the sinuous pipe line 24. The pump 48 in inlet line 14 in conjunction with the pressure regulating valve 62 in outlet line 16 are operated to maintain the liquid in the pipe line 24 at a pressure in the range of 2 to 20 atmospheres.

Oxygen gas from a source (not shown) flows along oxygen main line 18 under pressure and from there flows into the oxygen branch lines 20. The interlocking of the solenoid valve 74 with the pump 48 permits control of the relative flows of aqueous liquid into the pipe line 24 and oxygen gas into the main line 18 for reaction with the liquid.

The aqueous liquid flows along the pipe line 24 which provides a length of effective travel, i.e., the distance between inlet bend 38 and outlet bend 40, which is significantly less in length than the actual flow path 36 of travel of the aqueous liquid in the sinuous pipe line 24. This results in a relatively high holding or retention time of the aqueous liquid in the reactor 12 compared with the length of effective travel of the flowing liquid.

Oxygen gas is dispersed in the flowing aqueous liquid through the diffusers 22, 122 and 222. The upstream diffuser 22 is disposed in the inlet bend 38 which represents the inlet to the upstream reaction zone 26. Diffuser 122 is disposed in a U-bend pipe portion 34 downstream of the inlet bend 38, the latter U-bend pipe portion thus forms the inlet to intermediate reaction zone 28; in this way the aqueous liquid arriving at the inlet to the intermediate reaction zone 28 after flowing through the upstream reaction zone 26 has substantially consumed all of the oxygen which it entrained during the flow past diffuser 22. The aqueous liquid flowing past diffuser 122 has thus recovered its maximum dissolving or absorption capacity or power for oxygen which is injected at diffuser 122.

The aqueous liquid flowing past diffuser 122 thus dissolves its maximum capacity of oxygen, which oxygen is consumed in the intermediate reaction zone 28 of sinuous pipe line 24 such that the aqueous liquid arriving at diffuser 222 has substantially consumed the oxygen gas which it entrained during its flow past diffuser 122. Thus the aqueous liquid flowing past diffuser 222 has recovered its maximum dissolving power or absorption capacity for oxygen. The oxygen gas entrained in the aqueous liquid flowing past diffuser 222 is consumed in the downstream reaction zone 30 of the sinuous pipe line 24 such that the aqueous liquid exiting the sinuous pipe line 24 along outlet line 16 is substantially free of entrained or dissolved oxygen whereby foaming does not represent a problem in the liquid recovered from outlet line 16.

The aqueous liquid can be sampled at various sampling points in the assembly 10 by withdrawal of a sample of the flowing liquid through the sampling lines 42, 58, 66 and 70.

Likewise the temperature of the aqueous liquid can be monitored at several points in the reaction assembly 10 by the temperature indicators 32 and in the inlet line by the temperature indicators 46 and 50; similarily the pressure of the flowing aqueous liquid can be monitored in the inlet line 14 by the pressure gauges 52 and 54 and in the outlet line by the pressure gauge 64.

The flow of aqueous liquid in inlet line 14 can be monitored by flow meter 56 and the flow of oxygen in the oxygen branch lines 20 can be monitored by the flow meters 76. Likewise the pressure in the oxygen branch lines 20 can be monitored by pressure gauges 70.

Figure 3:
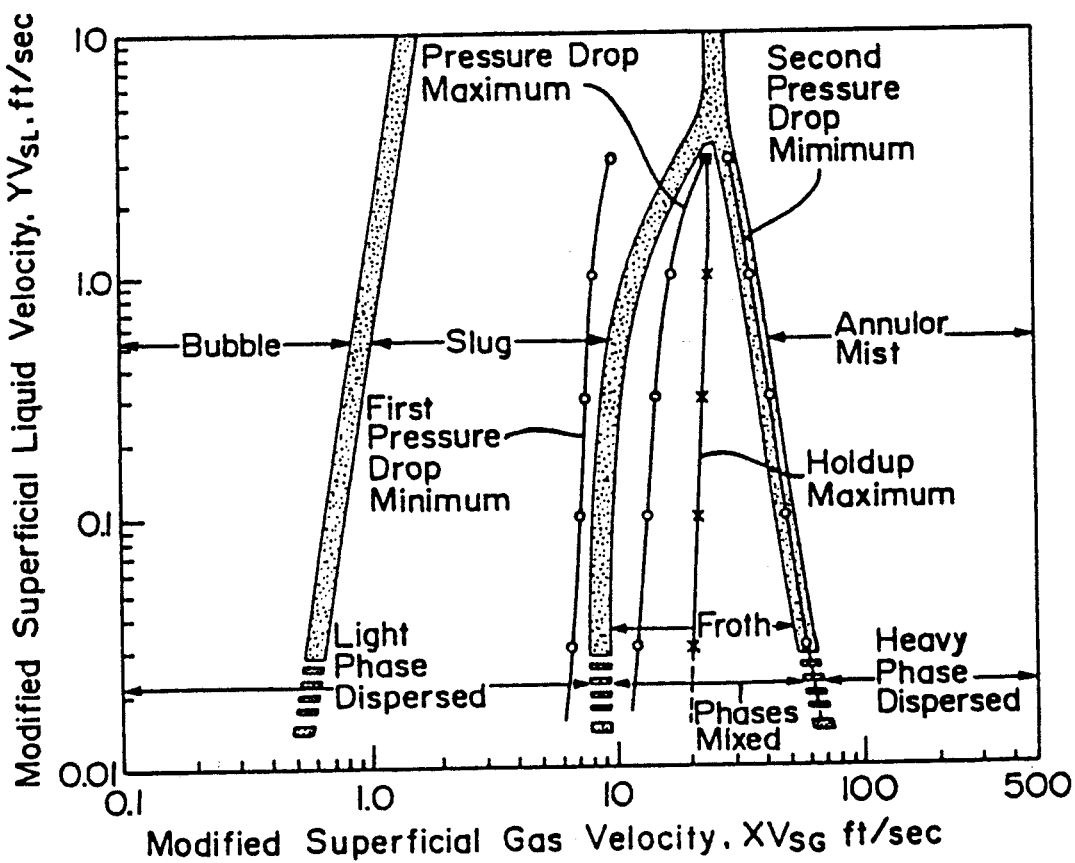
FIG. 3 is a flow pattern map.

With further reference to FIG. 3, there is shown a flow pattern for gas-liquid mixtures. In the particular embodiment of the present invention in which oxygen gas is being dispersed in water or aqueous liquid at ambient temperature Y and X are both approximately 1.

The flow pattern map particularly shows a bubble flow region, a slug flow region and an annular mist flow region as well as particular dispersed phases and a froth region, these regions being related to the relative velocities of the liquid and gas.

It can be seen, for example, that in the liquid velocity range of 5 to 10 ft/sec., with addition of a small amount of oxygen, bubble flow condition is obtained. As the volume of the oxygen increases the gas bubbles grow in size and the volume fraction of gas to liquid increases. Eventually a point is reached where coalescence of the oxygen bubbles occurs to give rise to gas slugs under a condition of slug flow.

If the gas flow is further increased while maintaining the same level of liquid flow, the liquid tends to flow along the wall of the flow path or pipe and the gas flows centrally of the flow path or pipe entraining liquid droplets. As the gas velocity is increased more liquid droplets are entrained by the gas until a point is reached where annular mist flow is established.

In accordance with the present invention the flow of the liquid, diameter of the pipe line, pressure in the pipe line and gas flow are chosen so that the bubble flow pattern exists in the pipe line. In practice large flow rates of gas which are usually employed to achieve the necessary dissolution in the liquid, lead to a flow pattern of slug or annular mist conditions, and the excess gas produces foaming problems. In the present invention this is avoided by introducing the gas at a plurality of spaced apart injection points which are spaced such that substantially all of the gas introduced into the liquid is consumed before more gas is added to the flowing liquid. The spacing and number of injection points are also selected so that the bubble flow condition is maintained.

The sinuous pipe line 24 may be disposed in a vertical plane or in a horizontal plane, however, the vertical plane is preferred in so far as this avoids accumulation of gas pockets adjacent the upper wall of the pipe portions 32 as might be the case if they were disposed in a horizontal plane.

Suitably, in the gas of pulp liquor and oxidation with oxygen, the oxygen gas may be injected in an amount per unit volume of the flowing liquid equivalent to a void fraction of less than 15% at a liquid velocity of 10 ft./sec.

We claim:

1. A method of reacting a low solubility gas with a substance in an aqueous medium comprising:

flowing an aqueous liquid comprising said substance in said aqueous medium along a flow line effective to maximize the flow path of said liquid per unit length of effective travel, at a velocity effective to induce turbulent flow conditions in said flow line, maintaining the liquid in said flow path at a pressure of 2 to 20 atmospheres, introducing a low solubility gas under pressure and capable of reacting with said substance into said liquid in said flow path through a plurality of spaced apart injection ports, in the form of gas bubbles having a diameter of not more than 100μ, dissolving substantially all of the gas injected per unit volume of the flowing liquid in the interval of flow between adjacent injection ports such that the solubility capacity of the flowing liquid for the gas is maximized at each injection port, and maintaining a flow pattern of said liquid and gas such that a bubble flow condition is exhibited throughout said flow path and plug flow is avoided.

2. A method according to claim 1, wherein said gas is injected in an amount per unit volume of the flowing liquid equivalent to a void fraction of less than 15% at a liquid velocity of at least 10 ft./sec.

3. A method according to claim 2, wherein said turbulent flow conditions correspond to a Reynolds number greater than 50,000, and the velocity is greater than 5 ft./sec.

4. A method according to claim 1, wherein said flow line is a sinuous flow line disposed in a vertical plane.

5. A method according to claim 1, wherein said aqueous liquid comprises a pulp liquor.

6. A method according to claim 5, wherein said bubbles have a diameter of 20 to 50 μ.

7. A method according to claim 1, wherein said aqueous liquid comprises an aqueous solution of said substance.

8. A method according to claim 1, wherein said aqueous liquid comprises an aqueous suspension of said substance.

9. A method according to claim 1, in which said gas comprises oxygen.

10. A method according to claim 1, wherein said aqueous liquid is a pulp liquor and said gas comprises oxygen, said gas being introduced at each injection port to establish a gas:liquid ratio, by volume, of 0.1 to 1.5:10.

11. A method according to claim 10, including a step of recovering reacted pulp liquor exiting from said flow path, substantially free of undissolved oxygen.

12. A method according to claim 11, carried out in the absence of venting of oxygen from said flow line.

13. A method of reacting a low solubility gas with a substance in an aqueous medium comprising:

flowing an aqueous liquid comprising said substance in said aqueous medium along a flow line effective to maximize the flow path of said liquid per unit length of effective travel, at a velocity effective to induce turbulent flow conditions in said flow line, maintaining the liquid in said flow path at a pressure of 2 to 20 atmospheres, introducing a low solubility gas under pressure and capable of reacting with said substance into said liquid in said flow path through a plurality of spaced apart injection ports, in the form of gas bubbles having a diameter of not more than 100 μ, said gas being introduced at said spaced apart injection ports in an amount to establish a gas:liquid ratio, by volume, of 0.1 to 1.5:10, in the flowing liquid, at said injection ports, allowing substantially all of said gas to react with said substance in said aqueous medium in the interval of flow between adjacent injection ports, maintaining a flow pattern of said liquid and gas such that a bubble flow condition is exhibited throughout said flow path and plug flow is avoided, and recovering the liquid exiting from said flow path substantially free of unreacted gas, said liquid flowing along said flowline in the absence of gas venting.

14. A method according to claim 13, in which said liquid is a pulp liquor and said gas comprises oxygen.

* * * * *